(12) United States Patent
Owada

(10) Patent No.: US 9,976,720 B2
(45) Date of Patent: May 22, 2018

(54) VEHICLE LIGHTING UNIT

(71) Applicant: Stanley Electric Co., Ltd., Tokyo (JP)

(72) Inventor: Ryotaro Owada, Tokyo (JP)

(73) Assignee: STANLEY ELECTRIC CO., LTD., Tokyo (JP)

( * ) Notice: Subject to any disclaimer, the term of this patent is extended or adjusted under 35 U.S.C. 154(b) by 150 days.

(21) Appl. No.: 14/974,500

(22) Filed: Dec. 18, 2015

(65) Prior Publication Data
US 2016/0178155 A1 Jun. 23, 2016

(30) Foreign Application Priority Data

Dec. 22, 2014 (JP) .................................. 2014-259041

(51) Int. Cl.
*B60Q 1/00* (2006.01)
*F21S 8/10* (2006.01)
(Continued)

(52) U.S. Cl.
CPC ........ *F21S 48/1329* (2013.01); *B60Q 1/0023* (2013.01); *B60Q 1/08* (2013.01); *F21S 48/1104* (2013.01); *F21S 48/1145* (2013.01); *F21S 48/1225* (2013.01); *F21S 48/1266* (2013.01); *F21S 48/1275* (2013.01); *F21S 48/1291* (2013.01); *F21S 48/14* (2013.01);
(Continued)

(58) Field of Classification Search
CPC . B60Q 1/0017; B60Q 1/0023; F21S 48/1329; F21S 48/1136; F21S 48/1145
USPC ......................................................... 362/465
See application file for complete search history.

(56) References Cited

U.S. PATENT DOCUMENTS 8,702,286 B2 * 4/2014 Nakazato ............. F21S 48/1145
362/510
9,444,217 B2 * 9/2016 Jeoung ...................... F21V 5/04
(Continued)

FOREIGN PATENT DOCUMENTS

DE    10 2004 005 931 A1    8/2004
DE    10 2006 053 020 A1    5/2008
(Continued)

OTHER PUBLICATIONS

The extended European search report for the related European Patent Application No. 15201896.6 dated May ,2016.

*Primary Examiner* — Anh Mai
*Assistant Examiner* — Matthew Peerce
(74) *Attorney, Agent, or Firm* — Kenealy Vaidya LLP

(57) ABSTRACT

A vehicle lighting unit can prevent the erroneous emission of laser light from a lens member through its light emission surface to the outside even when a wavelength converting member is dislocated. The vehicle lighting unit can include a laser light source, the wavelength converting member configured to receive the laser light and wavelength-convert at least part of the laser light, and the lens member including a light incident surface on which light from the wavelength converting member or the laser light is incident, a first reflecting surface configured to totally reflect the light from the light incident surface, and a light exiting surface through which the light from the first reflecting surface can exit. The lens member can further include a total-reflection prevention structure at the first reflecting surface, configured to prevent the laser light entering the lens member from being totally reflected by the first reflecting surface.

22 Claims, 13 Drawing Sheets

(51) Int. Cl.
*B60Q 1/08* (2006.01)
*F21Y 115/30* (2016.01)

(52) U.S. Cl.
CPC ......... *F21S 48/328* (2013.01); *F21S 48/1241* (2013.01); *F21Y 2115/30* (2016.08)

(56) References Cited

U.S. PATENT DOCUMENTS

| | | |
|---|---|---|
| 2011/0063115 A1 | 3/2011 | Kishimoto |
| 2013/0188377 A1 | 7/2013 | Konishi |
| 2014/0022804 A1 | 1/2014 | Konishi |
| 2015/0062943 A1* | 3/2015 | Takahira ............. F21S 48/1225 362/510 |

FOREIGN PATENT DOCUMENTS

| | | | |
|---|---|---|---|
| DE | 20 2014 003 078 U1 | 4/2014 | |
| DE | 202014003078 U1 * | 4/2014 | ................ F21V 7/06 |
| EP | 2 713 410 A1 | 4/2014 | |
| JP | 2010-170836 A | 8/2010 | |
| JP | 2011-66069 A | 3/2011 | |
| JP | 2013-38010 A | 2/2013 | |

\* cited by examiner

VEHICLE LIGHTING UNIT

This application claims the priority benefit under 35 U.S.C. § 119 of Japanese Patent Application No. 2014-259041 filed on Dec. 22, 2014, which is hereby incorporated in its entirety by reference.

TECHNICAL FIELD

The presently disclosed subject matter relates to a vehicle lighting unit provided with a lens member that can control light from a wavelength converting member, which can receive laser light for wavelength-converting the laser light.

BACKGROUND ART

There has been proposed a vehicle headlight including a laser light source and a wavelength converting member as well as a safety device, for example, those disclosed in Japanese Patent Application Laid-Open No. 2011-066069 (or US2011/0063115A1 corresponding to the Japanese laid-open publication). The vehicle headlight can project light obtained by wavelength-converting the original laser light from the laser light source by means of the wavelength converting member. In this vehicle headlight, there arises a problem in which the wavelength converting member is damaged, so that the laser light can erroneously exit through the damaged area to the outside. To cope with this problem, the vehicle headlight can include the safety device. The safety device can include a light detector configured to detect laser light intensity. The safety device can be configured to compare the output from the light detector with a reference value to suppress the output of the laser light on the basis of the comparison result.

In the above-described conventional art, the safety device is applied to the vehicle headlight being of a reflector type having a paraboloidal reflector. In view of this, there further arises a problem in which the safety device cannot be properly applied to a lighting unit having a lens member that can control light from a wavelength converting member, which can receive laser light for wavelength-converting the laser light, i.e., when the wavelength converting member is damaged, the lighting unit cannot properly prevent the erroneous emission of laser light from the lens member through its light emission surface to the outside even with the safety device.

SUMMARY

The presently disclosed subject matter was devised in view of these and other problems and features in association with the conventional art. According to an aspect of the presently disclosed subject matter, a vehicle lighting unit can include a laser light source, a wavelength converting member that can receive laser light for wavelength-converting the laser light, and a lens member that can control light from the wavelength converting member. The vehicle lighting unit can prevent the erroneous emission of laser light from the lens member through its light emission surface to the outside even when the wavelength converting member is dislocated.

According to another aspect of the presently disclosed subject matter, a vehicle lighting unit can include: a laser light source configured to emit laser light; a wavelength converting member configured to receive the laser light emitted from the laser light source and wavelength-convert at least part of the laser light to light with different wavelengths; and a lens member configured to include a light incident surface on which light from the wavelength converting member or the laser light is incident, a first reflecting surface configured to totally reflect the light from the light incident surface, and a light exiting surface through which the light totally reflected by the first reflecting surface can exit. In this vehicle lighting unit, the lens member can further include a total-reflection prevention structure at the first reflecting surface, the total-reflection prevention structure configured to prevent the laser light entering the lens member from being totally reflected by the first reflecting surface.

According to the above-mentioned aspect of the presently disclosed subject matter, in the vehicle lighting unit provided with the lens member that can control light from the wavelength converting member which can receive laser light for wavelength-converting the laser light, even when the wavelength converting member is dislocated from a predetermined position due to some reasons, the laser light can be prevented from being projected through the light exiting surface of the lens member to the outside. Specifically, even when the wavelength converting member is dislocated from the predetermined position due to some reasons, the total-reflection prevention structure can prevent the laser light entering the lens member from being totally reflected by the first reflecting surface.

According to another aspect of the presently disclosed subject matter, the vehicle lighting unit according to the previous aspect can be configured such that the lens member can further include a second reflecting surface, and the light exiting surface can be configured to be a convex lens surface having a rear-side focal point. The second reflecting surface can be configured to extend from the rear-side focal point of the light exiting surface or a vicinity thereof rearward and have a front end edge. The light incident surface, the first reflecting surface, the second reflecting surface, and the light exiting surface can constitute an optical system configured to form a low beam light distribution pattern including a cut-off line at its upper edge. Specifically, the light from the wavelength converting member can enter the lens member through the light incident surface and be totally reflected by the first reflecting surface. Then, the light can be partially shielded by the second reflecting surface and partially totally reflected by the same to be directed to and exit through the light exiting surface forward. Here, the cut-off line of the low beam light distribution pattern can be defined by the front end edge of the second reflecting surface.

According to the above-mentioned aspect of the presently disclosed subject matter, in the vehicle lighting unit provided with the lens member that can configured to form the low beam light distribution pattern by controlling the light from the wavelength converting member which can receive laser light for wavelength-converting the laser light, even when the wavelength converting member is dislocated from the predetermined position due to some reasons, the laser light entering the lens member can be prevented from exiting through the light exiting surface to the outside.

Alternatively, according to another aspect of the presently disclosed subject matter, the vehicle lighting unit according to the first aspect can be configured such that the light exiting surface can be configured to be a convex lens surface having a rear-side focal point. The light incident surface, the first reflecting surface, and the light exiting surface can constitute an optical system configured to form a high-beam light distribution pattern. Specifically, the light from the wavelength converting member can enter the lens member through the light incident surface and be totally reflected by the first reflecting surface. Then, the light can exit through the light exiting surface forward.

According to the above-mentioned aspect of the presently disclosed subject matter, in the vehicle lighting unit provided with the lens member that can configured to form the high-beam light distribution pattern by controlling the light from the wavelength converting member which can receive laser light for wavelength-converting the laser light, even when the wavelength converting member is dislocated from the predetermined position due to some reasons, the laser light entering the lens member can be prevented from exiting through the light exiting surface to the outside.

According to still another aspect of the presently disclosed subject matter, the vehicle lighting unit according to any one of the aforementioned aspects can be configured such that the total-reflection prevention structure can be a prism member including a prism light exiting surface configured to allow the laser light having entered the lens member to exit therethrough to the outside.

According to the above-mentioned aspect of the presently disclosed subject matter, in the vehicle lighting unit provided with the lens member that can control the light from the wavelength converting member which can receive laser light for wavelength-converting the laser light, even when the wavelength converting member is dislocated from the predetermined position due to some reasons, the laser light entering the lens member can be prevented from exiting through the light exiting surface to the outside. This is because, even when the wavelength converting member is dislocated from the predetermined position due to some reasons, the total-reflection prevention structure can prevent the laser light entering the lens member from being totally reflected by the first reflecting surface.

According to further another aspect of the presently disclosed subject matter, the vehicle lighting unit according to any one of the above-mentioned aspects can be configured such that the laser light source can be configured by a laser diode, and an optical fiber configured to guide the laser light emitted from the laser diode to the wavelength converting member.

According to the above-mentioned aspect of the presently disclosed subject matter, in the vehicle lighting unit provided with the lens member that can control the light from the wavelength converting member which can receive laser light for wavelength-converting the laser light, even when the wavelength converting member is dislocated from the predetermined position due to some reasons, the laser light entering the lens member can be prevented from exiting through the light exiting surface to the outside.

According to still further another aspect of the presently disclosed subject matter, the vehicle lighting unit according to the previous aspect can be configured to further include a photodetector configured to detect an intensity of at least one of the laser light from the laser light source and the wavelength-converted light from the wavelength converting member that exit to the outside of the lens member and to output a detection result, and a control unit configured to compare a predefined threshold value with the detection result from the photodetector and control the laser light source on the basis of a comparison result to prevent the laser light source from emitting laser light.

According to the above-mentioned aspect of the presently disclosed subject matter, in the vehicle lighting unit provided with the lens member that can control the light from the wavelength converting member which can receive laser light for wavelength-converting the laser light, even when the wavelength converting member is dislocated from the predetermined position due to some reasons, the laser light entering the lens member can be prevented from exiting through the light exiting surface to the outside. This is because the control unit can be configured to compare a predefined threshold value with the detection result from the photodetector and control the laser light source on the basis of a comparison result to prevent the laser light source from emitting laser light.

According to further another aspect of the presently disclosed subject matter, the vehicle lighting unit according to any of the previous aspects can be configured such that the laser light source can have a far field pattern and the total-reflection prevention structure can be disposed to extend in the same direction as the longitudinal direction of the far-field pattern.

According to the above-mentioned aspect of the presently disclosed subject matter, even when the wavelength converting member is dislocated from the predetermined position due to some reasons, the laser light emitted from the laser light source and entering the lens member can be prevented from exiting through the light exiting surface to the outside. At the same time, it is possible to prevent the decrease in utilization efficiency of luminous flux used for forming a light distribution pattern due to the total-reflection prevention structure.

BRIEF DESCRIPTION OF DRAWINGS

These and other characteristics, features, and advantages of the presently disclosed subject matter will become clear from the following description with reference to the accompanying drawings, wherein.

DESCRIPTION OF EXEMPLARY EMBODIMENTS

A description will now be made below to vehicle lighting units of the presently disclosed subject matter with reference to the accompanying drawings in accordance with exemplary embodiments.

Figure 1A:
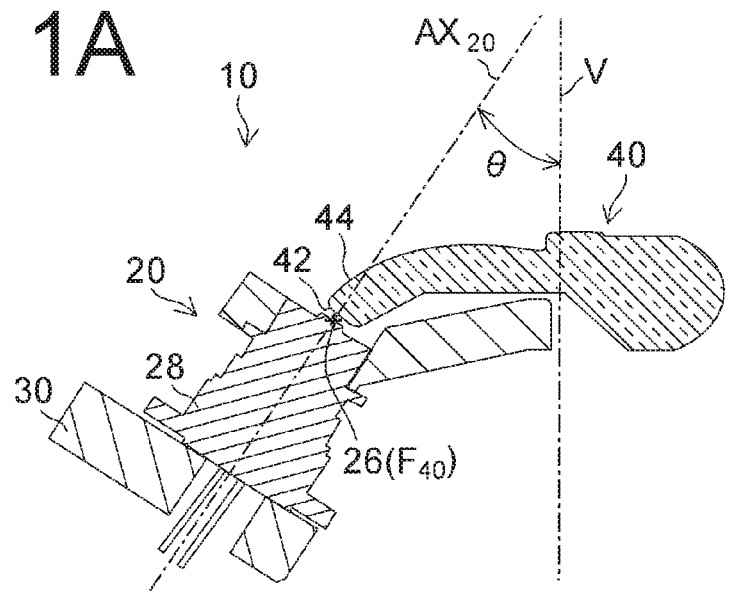
FIG. 1A is a cross-sectional view of a vehicle lighting unit made in accordance with principles of the presently disclosed subject matter as one exemplary embodiment.
Figure 2:
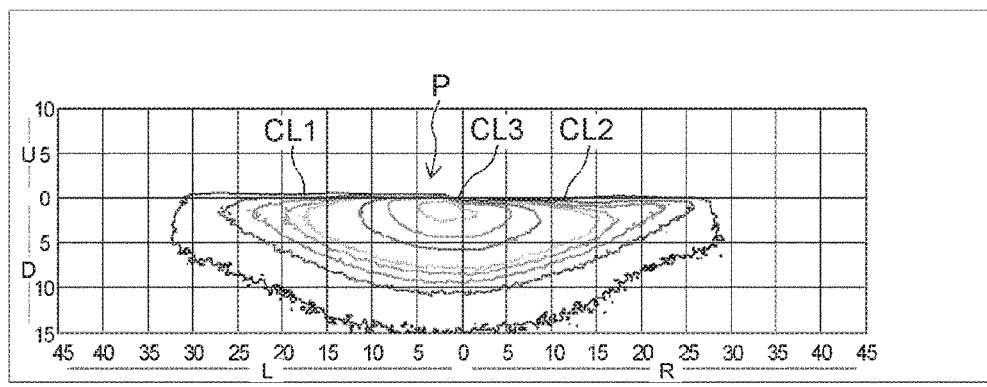
FIG. 2 is a graph showing a low beam light distribution pattern P formed by the vehicle lighting unit 10 (lens member 40) of FIG. 1A on a virtual vertical screen assumed to be disposed in front of the vehicle lighting unit about 25 meters away from its front surface.

FIG. 1A is a cross-sectional view of a vehicle lighting unit 10 made in accordance with the principles of the presently disclosed subject matter as one exemplary embodiment, and FIG. 1A is an enlarged sectional view of the vehicle lighting unit 10 of FIG. 1A. Note that a total-reflection prevention structure 56 is not illustrated in FIG. 1A. FIG. 2 is a graph showing a low beam light distribution pattern P formed by the vehicle lighting unit 10 (lens member 40) of FIG. 1A on a virtual vertical screen assumed to be disposed in front of the vehicle lighting unit 10 about 25 meters away from its front surface.

The vehicle lighting unit 10 of this exemplary embodiment can be configured to form the low beam light distribution pattern P including cut-off lines CL1 to CL3 at it supper edge as illustrated in FIG. 2, and include a light emitting device 20, a lens member 40, etc.

Figure 1B:
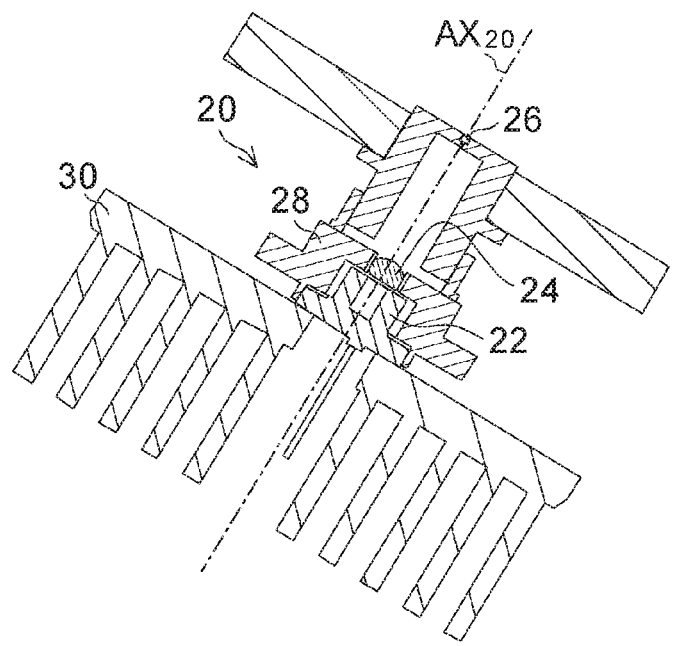
FIG. 1B is an enlarged sectional view of the vehicle lighting unit of FIG. 1A.

The light emitting device 20, as illustrated in FIG. 1B, can include a semiconductor light emitting element 22, a condenser lens 24, a wavelength converting member 26, etc. The semiconductor light emitting element 22, the condenser lens 24, and the wavelength converting member 26 can be disposed in this order along a reference axis $AX_{20}$ also serving as an optical axis $AX_{20}$ of the light emitting device 20.

The semiconductor laser element 22 can be a semiconductor laser light source such as a laser diode configured to emit blue laser light (emission wavelength of 450 nm), for example. The semiconductor laser element 22 can be mounted and sealed in a package of CAN type.

Figure 3A:
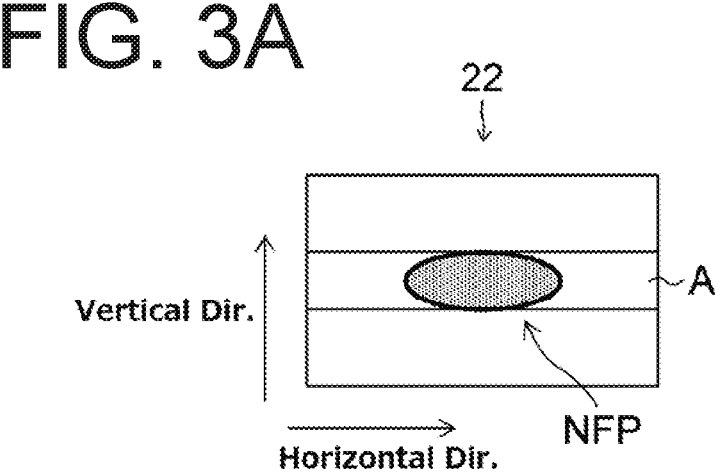
FIG. 3A is a schematic front view of a semiconductor laser element 22.
Figure 3B:
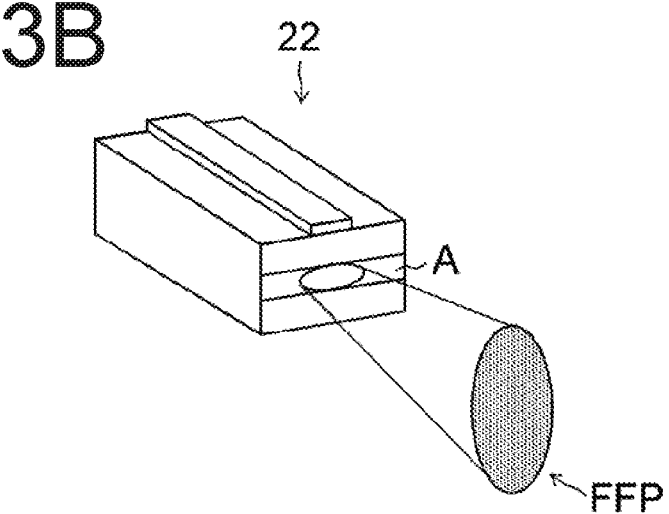
FIG. 3B is a schematic perspective view of the semiconductor laser element 22.

FIG. 3A is a schematic front view of the semiconductor laser element 22 in which an ellipse represents a near field pattern (NFP), and FIG. 3B is a schematic perspective view of the semiconductor laser element 22 in which an ellipse represents a far field pattern (FFP). The FFP unlike the NFP can be formed in an ellipse extending in a direction approximately orthogonal to the light emitting portion of the junction face A (active region) due to the effect of diffraction.

Figure 4:
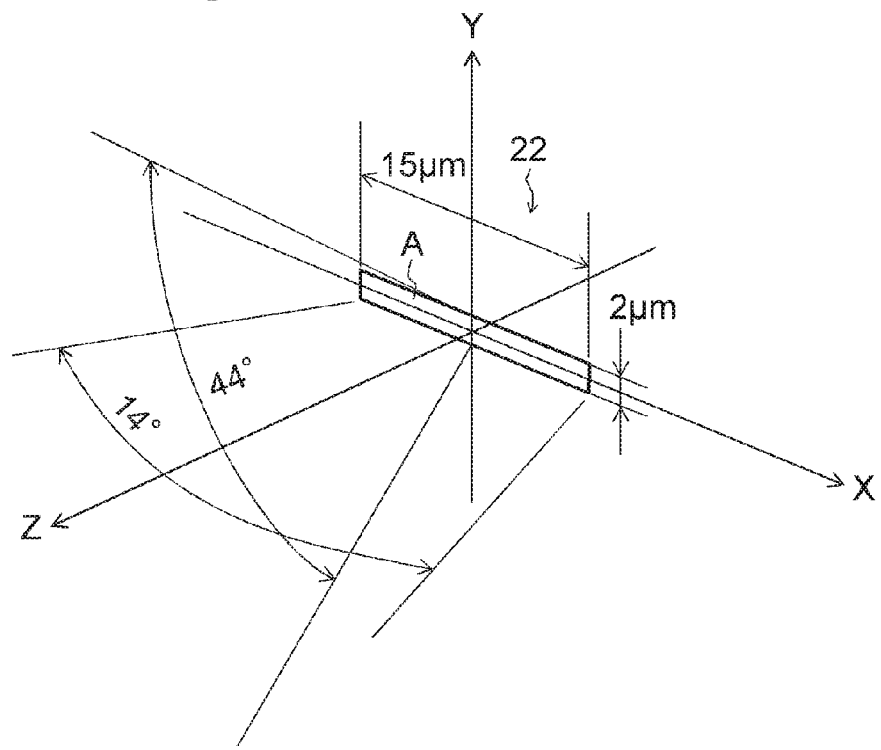
FIG. 4 is a diagram illustrating the size of a light emission portion and a beam divergence angle of the semiconductor laser element 22.

As illustrated in FIG. 1B, the semiconductor laser element 22 can be held in a holding member 28 with a posture thereof such that the longitudinal direction of the FFP is coincident with the left-right direction of a vehicle body on which the vehicle lighting unit 10 is to be installed (vehicle width direction perpendicular to the paper surface of the drawing). In this exemplary embodiment, as illustrated in FIG. 4, the semiconductor laser element 22 can have the active region A that is a light emission portion having a size of 15 μm in width and 2 μm in height. Further, the semiconductor laser element 22 of this exemplary embodiment can emit laser light having a spread with an angle of 14° at which the light intensity becomes $1/e^2$ (approximately 13.5%) relative to the peak intensity in a direction parallel with the active region A and with an angle of 44° at which the light intensity becomes $1/e^2$ (approximately 13.5%) relative to the peak intensity in a direction perpendicular to the active region A. Note that the longitudinal direction of the FFP may be a vertical direction (direction orthogonal to the vehicle width direction, or vertical direction in FIGS. 1A and 1B).

The condenser lens 24 can be configured to condense the laser light from the semiconductor laser element 22. The condenser lens 24 can be held by the holding member 28, for example, to be disposed in between the semiconductor laser element 22 and the wavelength converting member 26.

The wavelength converting member 26 can be configured to receive the laser light emitted from the semiconductor laser element 22 and condensed by the condenser lens 24 and wavelength-convert at least part of the light to light with different wavelengths. The wavelength converting member 26 can be a rectangular plate-shaped phosphor having a light emission size of 0.4 mm×0.8 mm.

Figure 5:
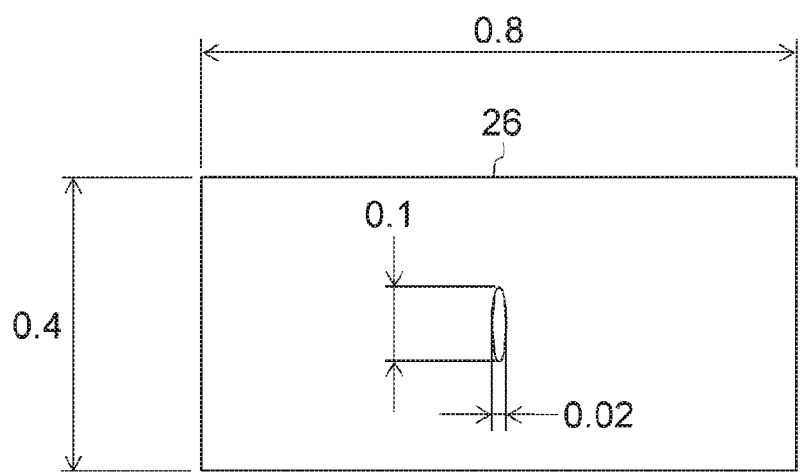
FIG. 5 is a diagram illustrating a state in which a wavelength converting member 26 (area surrounded by an ellipse) is irradiated with laser light emitted from the semiconductor laser element 22 and converged by a condenser lens 24.
Figure 6A:
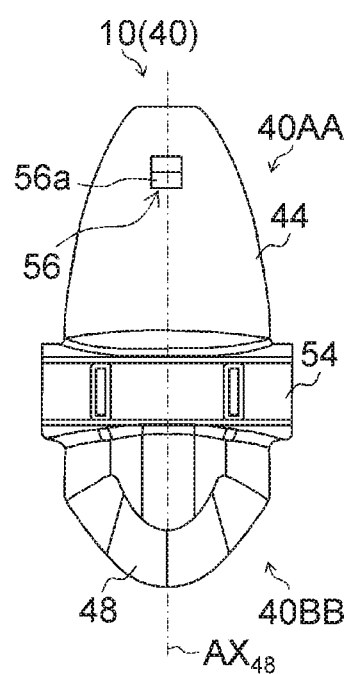
FIGS. 6A, 6B, 6C, and 6D are a top plan view, a front view, a perspective view, and a side view of the lens member 40, respectively.
Figure 6C:
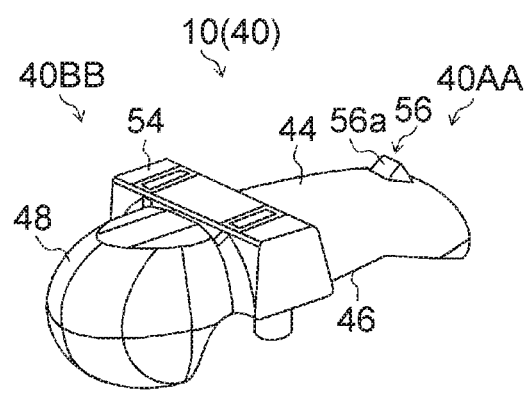
Figure 6B:
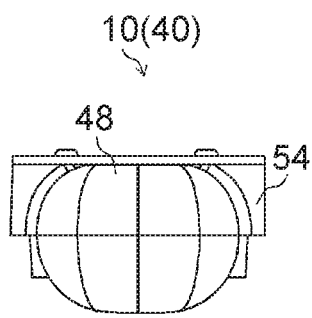
Figure 6D:
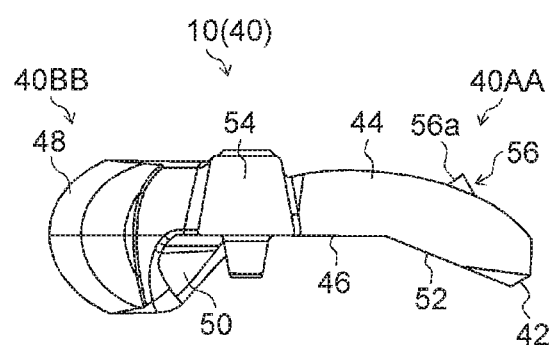

FIG. 5 is a diagram illustrating a state in which the wavelength converting member 26 is irradiated with laser light emitted from the semiconductor laser element 22 and converged by the condenser lens 24. In the drawing, the area surrounded by an ellipse is a spot-like pattern of laser light from the semiconductor laser element 22, and the numerical values show the sizes of respective portions in the unit of millimeters.

The wavelength converting member 26 can be held in the holding member 28 at a position distanced away from the semiconductor laser element 22 with a posture thereof such that the longitudinal direction of the wavelength converting member 26 is coincident with the shorter-side direction of the FFP. In a certain embodiment, the wavelength converting member 26 can be disposed at or near a light source point $F_4$, e.g., at a position approximately 5 to 10 mm away from the semiconductor laser element 22, which is herein referred to as a "predetermined position." Here, the light source point $F_{40}$ is meant to be a position where the light source should be located with respect to the lens member 40, or considered as a designed position or a reference position.

The wavelength converting member 26 can receive laser light emitted from the semiconductor laser element 22 and condensed by the condenser lens 24 and be configured to emit pseud white light by color mixture of a portion of blue laser light directly through the wavelength converting member 26 and yellow light generated (wavelength-converted) by the wavelength converting member 26 excited by a portion of the blue laser light.

The light emitting device 20 (including the wavelength converting member 26) can be held by a holding member 30 such as a heat sink at a position distanced away from the lens member 40 (light incident surface 42 to be described later) with a posture thereof such that the optical axis $AX_{20}$ thereof is inclined by an angle θ relative to the vertical line V. In a certain embodiment, the light emitting device 20 can be disposed at a position 0.1 mm away from the light incident surface 42 of the lens member 40. The angle θ can be set in such a manner that the amount of light emitted from the light emitting device 20 (wavelength converting member 26) and entering the lens member 40 and the amount of light totally reflected by a first reflecting surface 44 (to be described later) of the lens member 44 are maximized. For example, in a certain embodiment, the angle θ can be set at 34 degrees.

Figure 7:
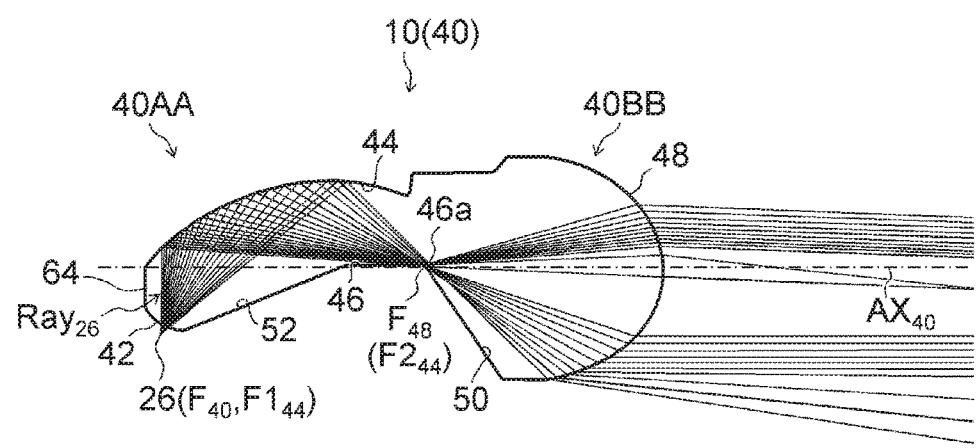
FIG. 7 is a schematic cross-sectional view of the lens member 40 in a state in which the light from a light emitting device 20 including the wavelength converting member 26 travels through the lens member 40 while not illustrating a total-reflection prevention structure.

FIGS. 6A, 6B, 6C, and 6D are a top plan view, a front view, a perspective view, and a side view of the lens member 40, respectively. FIG. 7 is a schematic cross-sectional view of the lens member 40 in a state in which the light from the light emitting device 20 including the wavelength converting member 26 travels through the lens member 40 while not illustrating a total-reflection prevention structure for simplification.

The lens member 40 can be disposed in front of the light emitting device 20 including the wavelength converting member 26, and can include a rear end portion 40AA and a front end portion 40BB as illustrated in FIGS. 6A to 6D and 7. Light rays $Ray_{28}$ emitted from the light emitting device 20 including the wavelength converting member 26 can enter the inside of the lens member 40 through the rear end portion 40AA (light incident surface 42) and exit through the front end portion 40BB (light exiting surface 48), so that the lens member 40 can project light forward to form the low beam light distribution pattern P including the upper edge cut-off lines CL1 to CL3, as illustrated in FIG. 2. The lens member 40 can be formed from a transparent material such as a transparent resin like a polycarbonate resin, an acrylic resin, etc., a glass material, etc.

The rear end portion 40AA of the lens member 40 can include the light incident surface 42 and the first reflecting surface 44. The front end portion 40BB of the lens member 40 can include a convex lens surface or a light exiting surface 48. The lens member 40 can further include a second reflecting surface 46 disposed between the rear end portion 40AA and the front end portion 40BB of the lens member 40.

Figure 8A:
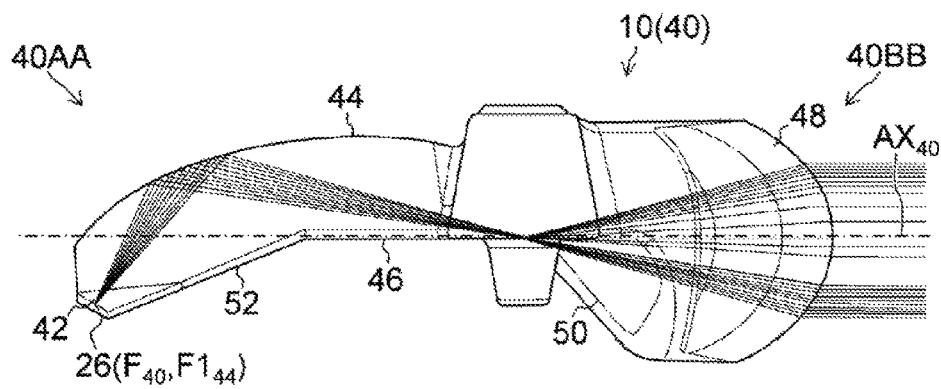
FIG. 8A is a schematic cross-sectional view of the lens member 40 in a state in which the light from the light emitting device 20 including the wavelength converting member 26 dislocated from a predetermined position (see FIGS. 1A and 1B) (the laser light from the semiconductor laser element 22) travels through the lens member 40 while there is no total-reflection prevention structure as a comparison.
Figure 8B:
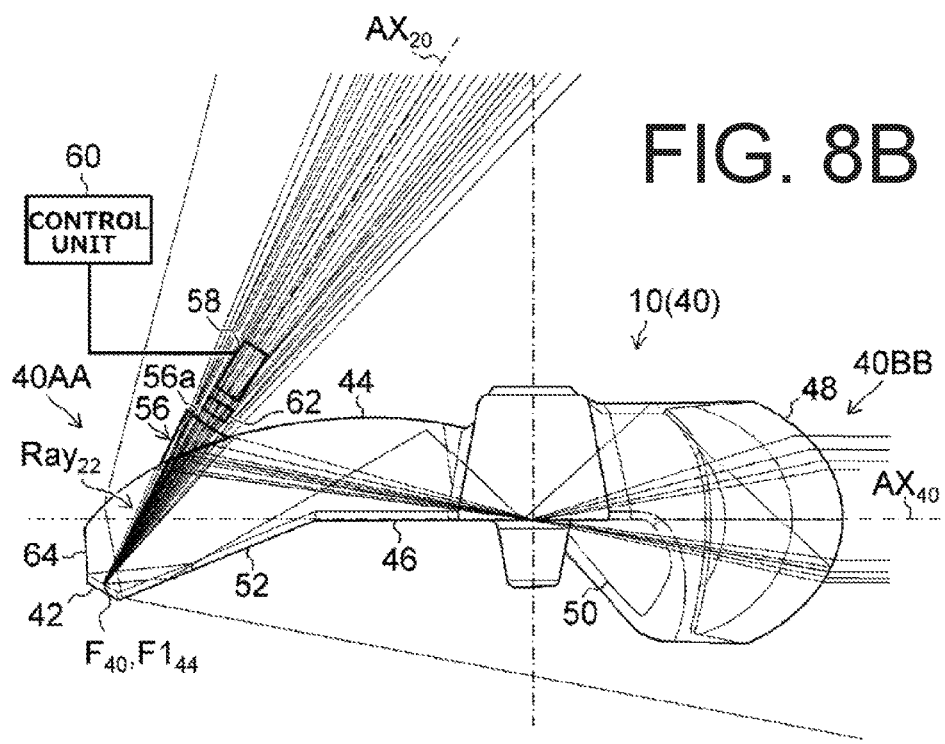
FIG. 8B is a schematic cross-sectional view of the lens member 40 in a state in which the light from the light emitting device 20 including the wavelength converting member 26 dislocated from a predetermined position (see FIGS. 1A and 1B) (the laser light from the semiconductor laser element 22) travels through the lens member 40 while there is a total-reflection prevention structure 56.

The light incident surface 42 of the rear end portion 40AA can receive light rays $Ray_{26}$ emitted from the light emitting device 20 including the wavelength converting member 26 when the wavelength converting member 26 is disposed at a predetermined position as illustrated in FIG. 7, etc., so that the light rays $Ray_{26}$ enter the inside of the lens member 40. Further, light incident surface 42 can also receive light rays $Ray_{22}$ emitted directly from the semiconductor laser element 22 of the light emitting device 20 when the wavelength converting member 26 is dislocated from the predetermined position as illustrated in FIG. 8B, so that the light rays $Ray_{22}$ enter the inside of the lens member 40. Furthermore, the light incident surface 42 can be configured such that the light rays $Ray_{26}$ having entered the inside of the lens member 40 may have a narrow directivity. It should be noted that the "dislocated (displaced)" used herein means to include a case in which the wavelength converting member 26 is moved from the originally set position and a case in which the wavelength converting member 26 is damaged in part to fail to exert the originally intended function. Furthermore, the shape of the light incident surface 42 can be a plain surface or a convex or concave curved surface configured in such a manner that the light rays $Ray_{26}$ having entered the inside of the lens member 40 may have a narrow directivity.

The first reflecting surface 44 can be configured to totally reflect the light rays $Ray_{26}$ having been emitted from the light emitting device 20 including the wavelength converting member 26 and entered the inside of the lens member 40. The first reflecting surface 44 can be formed by an ellipsoidal or similar free curved surface having a first focal point $F1_{44}$ set at or near the light source point $F_{40}$ and a second focal point $F2_{44}$ set at or near a focal point $F_{48}$ of the light exiting surface 48 to be described later.

The second reflecting surface 46 can be configured to totally reflect at least part of the light rays $Ray_{26}$ having entered the inside of the lens member 40 and been totally reflected by the first reflecting surface 44. The second reflecting surface 46 can be configured to extend from the focal point $F_{48}$ of the light exiting surface 48 or a vicinity thereof rearward and in a substantially horizontal direction so as to be a planar reflecting surface. In another exemplary embodiment, the second reflecting surface 46 may be configured to be an inclined planar reflecting surface relative to the horizontal direction.

The second reflecting surface 46 can have a front end edge 46a configured to form the cut-off lines CL1 to CL3 in the low beam light distribution pattern P. In order to clearly define the cut-off lines CL1 to CL3 in the low beam light distribution pattern P, the front end edge 46a can be an arc shape concave forward (not illustrated). Specifically, the front end edge 46a of the second reflecting surface 46 can be an arc shape when viewed from above, the arc shape being configured such that the front end edge on a reference axis $AX_{40}$ is located at or near the focal point $F_{48}$ of the light exiting surface 48 and the front end edge away from the lateral sides from the reference axis $AX_{40}$ extend forward. Here, the reference axis $AX_{40}$ can be designed to be coincident with the optical axis of the lens member 40 in a front-rear direction of a vehicle body.

Furthermore, the front end edge 46a of the second reflecting surface 46 can be a linear shape substantially parallel with the horizontal direction when viewed from its front side, the line of the front end edge 46a passing at or near the focal point $F_{48}$ of the light exiting surface 48 on the reference axis $AX_{40}$ (a horizontal center or around of the lens member 40).

Furthermore, the front end edge 46a of the second reflecting surface 46 can include a side corresponding to the left-horizontal cut-off line CL1, a side corresponding to the right-horizontal cut-off line CL2, and a side corresponding to the inclined cut-off line CL3 connecting the left-horizontal cut-off line CL1 and the right-horizontal cut-off line CL2 (not illustrated). The side corresponding to the left-horizontal cut-off line CL can be disposed at a position lower than the side corresponding to the right-horizontal cut-off line CL2 in the vertical direction when the automobile on which the vehicle lighting unit is installed is for left-hand traffic. Of course, the side corresponding to the left-horizontal cut-off line CL1 can be disposed at a position higher than the side corresponding to the right-horizontal cut-off line CL2 in the vertical direction when the automobile on which the vehicle lighting unit is installed is for right-hand traffic.

As illustrated in FIG. 7, the light rays $Ray_{26}$ having entered the lens member 40 through the light incident surface 42 can be totally reflected by the first reflecting surface 44, and part of the light rays $Ray_{26}$ can be shielded by the second reflecting surface 46. Another part of the light rays $Ray_{26}$ not shielded by the second reflecting surface 46 and light rays internally reflected by the second reflecting surface 46 can exit through the light exiting surface 48 (the former passing through the lower side of the light exiting surface 48 and the latter passing through the upper side thereof relative to the reference axis $AX_{40}$) to be projected forward. Specifically, the light rays having been totally reflected by the second reflecting surface 46 can form a pattern obtained by folding the original pattern thereof at the front end edge 46a of the second reflecting surface 46 as a border to be superimposed on the portion below the cut-off lines CL1 to CL3.

In this manner, the low beam light distribution pattern P, as illustrated in FIG. 2, including the upper end edge cut-off lines CL1 to CL3 that are defined by the front end edge 46a of the second reflecting surface 46 can be formed by the light rays exiting through the upper and lower sides of the light exiting surface 48.

The light exiting surface 48 can be configured as a convex lens surface projected forward and having the rear-side focal point $F_{48}$ at or near the front end edge 46a of the second reflecting surface 46a (at or near the horizontal center of the front end edge 46a, for example). The light exiting surface 48 can function as the convex lens to project the light distribution image (light source image) formed by the light rays $Ray_{26}$ having been totally reflected by the first reflecting surface 44 at or near the rear-side focal point $F_{48}$ of the light exiting surface 48 while inverting the image, thereby forming the low beam light distribution pattern P including the upper end edge cut-off lines CL1 to CL3.

As described above, the light incident surface 42, the first reflecting surface 44, the second reflecting surface 46, and the light exiting surface 48 can constitute an optical system configured to form the low beam light distribution pattern P including the cut-off lines CL1 to CL3 at its upper edge. Specifically, the light rays $Ray_{26}$ from the wavelength converting member 26 of the light emitting device 20 can enter the inside of the lens member 40 through the light incident surface 42 and be totally reflected by the first reflecting surface 44. Then, the light rays $Ray_{26}$ can be partially shielded by the second reflecting surface 46 and partially totally reflected by the same second reflecting surface 46 to be directed to and exit through the light exiting surface 48 forward. Here, the cut-off lines CL1 to CL3 of the low beam light distribution pattern P can be defined by the front end edge 46a of the second reflecting surface 46.

The thus configured lens member 40 can include the total-reflection prevention structure 56 as illustrated in FIG. 6.

When the wavelength converting member 26 is dislocated from the predetermined position due to some reasons, the laser light rays $Ray_{22}$ from the semiconductor laser element 22 can be directly emitted from the light emitting device 20 to enter the inside of the lens member 40 (see FIG. 8B).

Even when it happens, the total-reflection prevention structure 56 can prevent the total reflection of the laser light rays $Ray_{22}$ emitted from the semiconductor laser element 22 and entering the inside of the lens member 40, and has a structure of a prism 56 as illustrated in FIG. 6, for example.

Specifically, the prism 56, as illustrated in FIG. 8B, can include a prism light exiting surface 56a configured to allow the laser light rays $Ray_{22}$ having entered the lens member 40 to exit therethrough to the outside.

Figure 9:
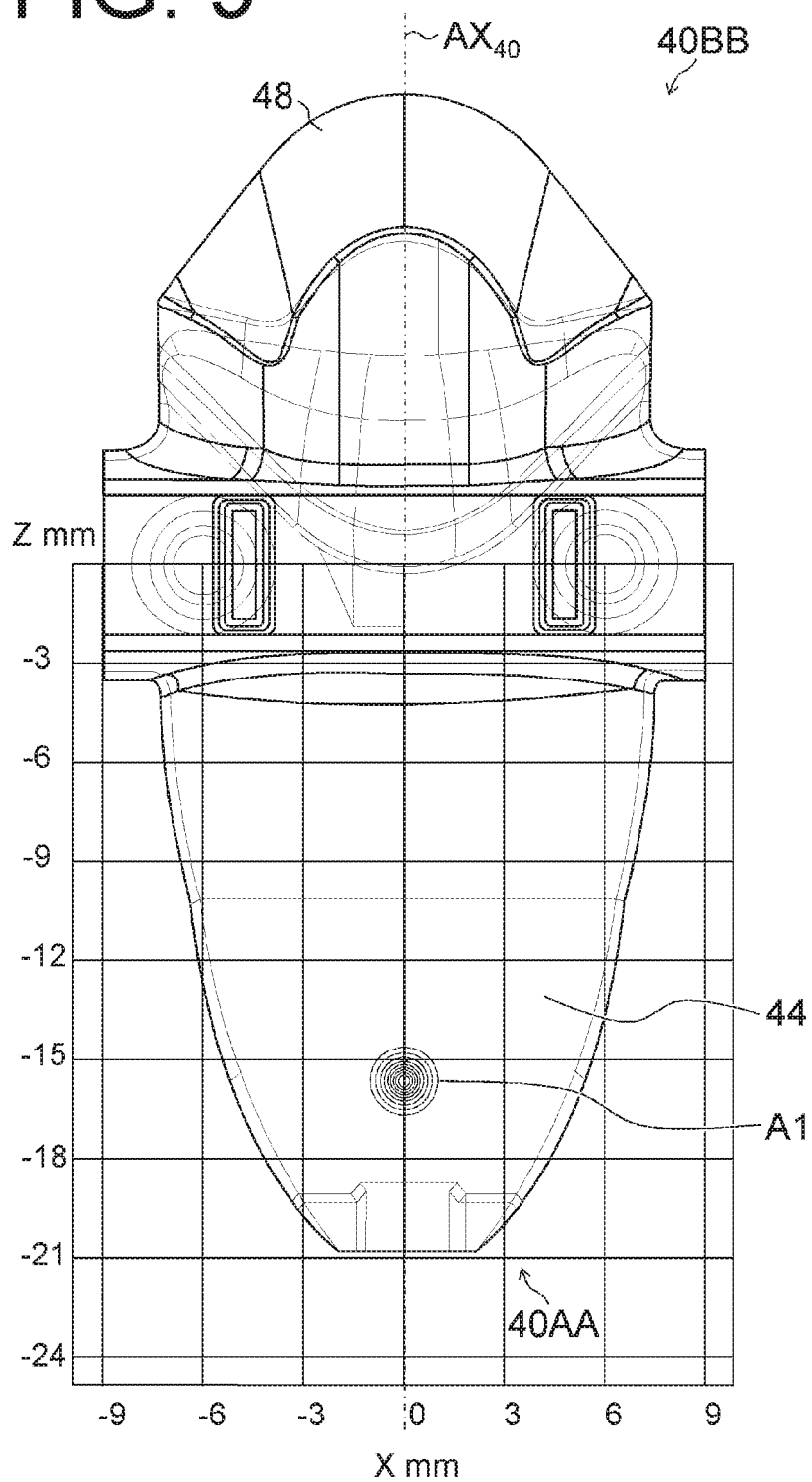
FIG. 9 is a top plan view of the lens member 40 as Example 2.

The prism 56 can be disposed to extend in the same direction as the longitudinal direction of the FFP of the semiconductor laser element 22 so as to cover a region of the first reflecting surface 44 where the laser light rays $Ray_{22}$ having been emitted from the semiconductor laser element 22 and entered the lens member 40 can reach (a region around the optical axis $AX_{20}$ of the light emitting device 20), or a region A1 illustrated in FIG. 9. Specifically, the region A1 in FIG. 9 represents a region where the laser light rays $Ray_{22}$ having been emitted from the semiconductor laser element 22 and entered the lens member 40 can reach when the semiconductor laser element 22 is disposed with a posture thereof such that the longitudinal direction of the FFP is coincident with the left-right direction (vehicle width direction or the left-right direction in FIG. 9).

Figure 10:
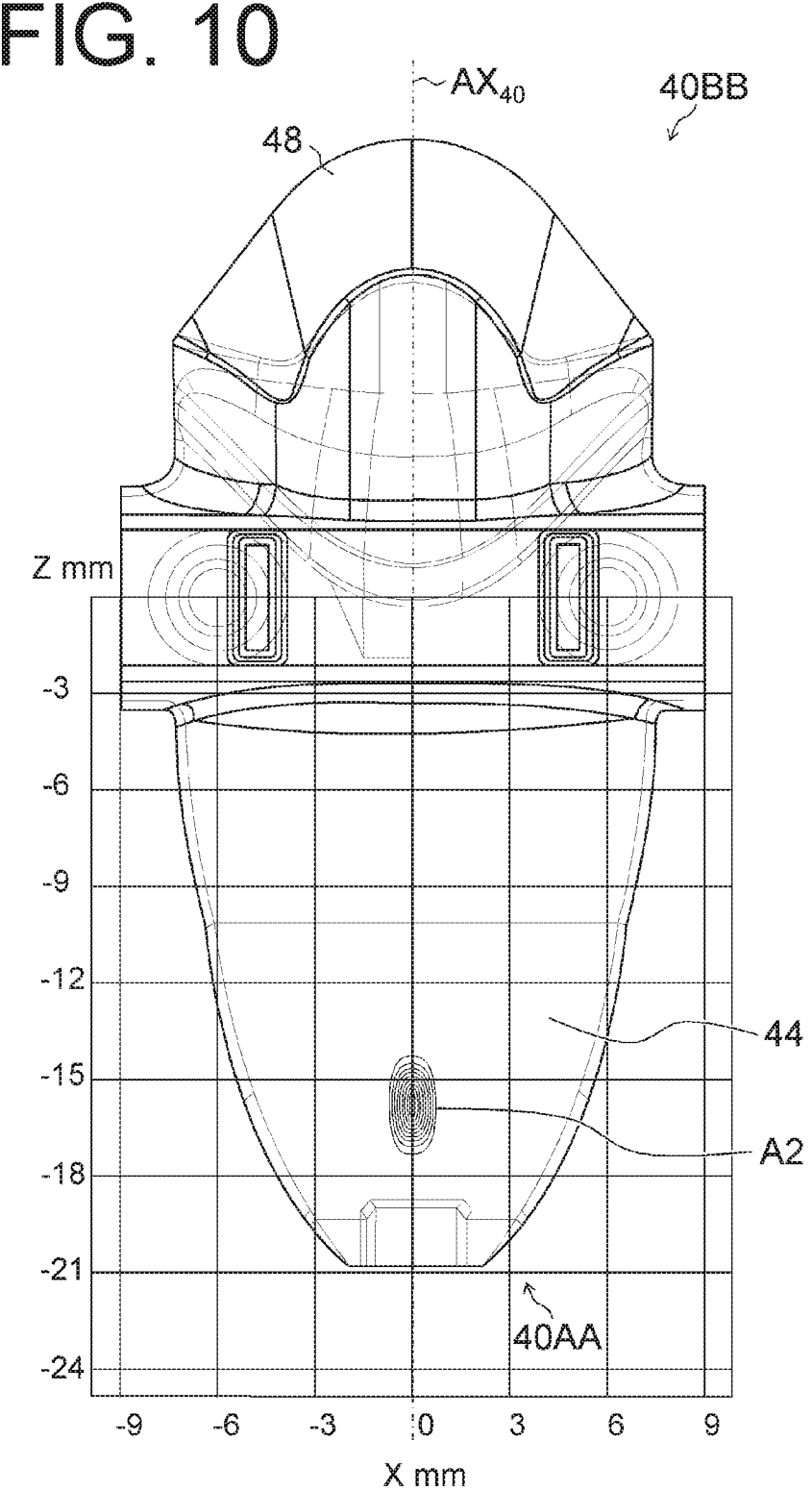
FIG. 10 is a top plan view of the lens member 40 as Example 1.

In an alternative exemplary embodiment, the prism 56 may be disposed to extend in the same direction as the longitudinal direction of the FFP of the semiconductor laser element 22 so as to cover a region A2 of the first reflecting surface 44 illustrated in FIG. 10. Specifically, the region A2 in FIG. 10 represents a region where the laser light rays $Ray_{22}$ having been emitted from the semiconductor laser element 22 and entered the lens member 40 can reach when the semiconductor laser element 22 is disposed with a posture thereof such that the longitudinal direction of the FFP is coincident with the front-rear direction (vehicle front-rear direction or the vertical direction in FIG. 10).

By means of the prism 56 having the above-described configuration, even when the wavelength converting member 26 is dislocated from the predetermined position due to some reasons, the laser light rays $Ray_{22}$ having been emitted from the semiconductor laser element 22 and entered the lens member 40 can be prevented from exiting through the light exiting surface 48 to the outside.

This can be achieved as follows. When the wavelength converting member 26 is dislocated from the predetermined position due to some reasons, the laser light rays $Ray_{22}$ having been emitted from the semiconductor laser element 22 and entered the lens member 40 can exit through the prism light exiting surface 56a to the outside. This can prevent the laser light rays $Ray_{22}$ having been emitted from the semiconductor laser element 22 and entered the lens member 40 from being totally reflected by the first reflecting surface 44.

Next, the above-mentioned effects will be discussed. The present inventor has performed computer simulation using a computer program developed by Stanley Electric Co., Ltd. to confirm the above-mentioned effects as Comparative Example 1, and Examples 1 and 2.

Comparative Example 1

Under conditions in which the semiconductor laser element 22 had an output of 3 W, the lens member 40 did not have any prism 56, and the light emitting device 20 did not have any wavelength converting member 26, the laser light rays $Ray_{22}$ emitted from the semiconductor laser element 22 and exiting through the light exiting surface 48 were confirmed in terms of its output and resulting light distribution pattern.

Figure 11A:
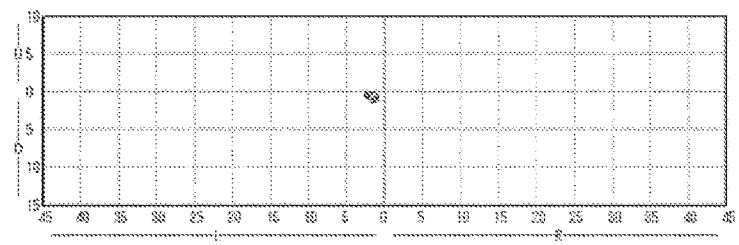
FIGS. 11A, 11B, and 11C are graphs showing simulation results of Comparative Example 1, Example 1, and Example 2, respectively.

The results showed that the output of the laser light rays $Ray_{22}$ emitted from the semiconductor laser element 22 and exiting through the light exiting surface 48 was 2.75 W and the light distribution pattern shown in FIG. 11A was formed on a virtual vertical screen.

Example 1

Under conditions in which the semiconductor laser element 22 had an output of 3 W, the lens member 40 had the prism 56 disposed in the region A2 illustrated in FIG. 10, and the light emitting device 20 did not have any wavelength converting member 26, the laser light rays $Ray_{22}$ emitted from the semiconductor laser element 22 and exiting through the light exiting surface 48 were confirmed in terms of its output and resulting light distribution pattern.

Figure 11B:
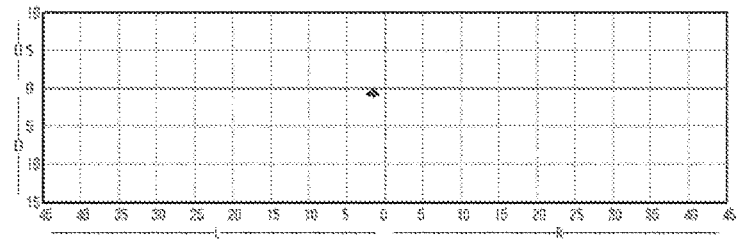

The results showed that the output of the laser light rays $Ray_{22}$ emitted from the semiconductor laser element 22 and exiting through the light exiting surface 48 was 0.11 W and the light distribution pattern shown in FIG. 11B was formed on a virtual vertical screen.

Example 2

Under conditions in which the semiconductor laser element 22 had an output of 3 W, the lens member 40 had the prism 56 disposed in the region A1 illustrated in FIG. 9, and the light emitting device 20 did not have any wavelength converting member 26, the laser light rays $Ray_{22}$ emitted from the semiconductor laser element 22 and exiting through the light exiting surface 48 were confirmed in terms of its output and resulting light distribution pattern.

Figure 11C:
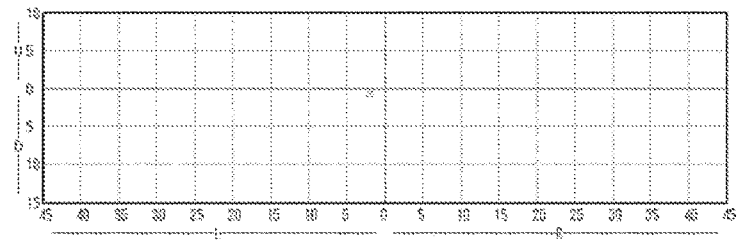

The results showed that the output of the laser light rays $Ray_{22}$ emitted from the semiconductor laser element 22 and exiting through the light exiting surface 48 was 0.02 W and the light distribution pattern shown in FIG. 11C was formed on a virtual vertical screen.

The test conditions and obtained results are listed in Table 1.

TABLE 1

| | Prism (Location) | Output (to 3 W) | Light Distribution Pattern |
|---|---|---|---|
| Example 1 | A2 (FIG. 10) | 0.11 W (3.67%) | FIG. 11B |
| Example 2 | A1 (FIG. 9) | 0.02 W (0.67%) | FIG. 11C |
| Comparative Example 1 | None | 2.75 W (91.7%) | FIG. 11A |

According to the obtained results in Comparative Example 1 and Examples 1 and 2 as listed in Table 1, if the prism 56 is disposed in the region (for example, the regions A1 and A2) where the laser light rays $Ray_{22}$ emitted from the semiconductor laser element 22 reach, even when the wavelength converting member 26 is dislocated from the predetermined position due to some reasons, the laser light rays $Ray_{22}$ having been emitted from the semiconductor laser element 22 and entered the lens member 40 can exit through the prism light exiting surface 56a of the prism 56 to the outside and thus can be prevented from exiting through the light exiting surface 48 to the outside. Further, it was confirmed that the amount of blue laser light directly exiting through the light exiting surface 48 in Example 2 could be reduced by 1/100 or less than in Comparative Example 1.

Next, the influences of the provision of the prism 56 on the formation of the low beam light distribution pattern P will be discussed. The present inventor has performed computer simulation using a computer program developed by Stanley Electric Co., Ltd. to confirm the influences as Comparative Example 2 and Example 3.

Comparative Example 2

Under conditions in which the semiconductor laser element 22 had an output of 3 W, the lens member 40 did not have any prism 56, and the light emitting device 20 had the wavelength converting member 26, the light rays $Ray_{26}$ emitted from the wavelength converting member 26 and exiting through the light exiting surface 48 were confirmed in terms of its light flux and the maximum light intensity in the resulting low beam light distribution pattern.

The results showed that the light flux of the light rays $Ray_{26}$ emitted from the wavelength converting member 26 and exiting through the light exiting surface 48 was 267.5 lm and the maximum light intensity in the resulting low beam light distribution pattern was 14,465 cd. Further it was confirmed that the light flux utilization efficiency was 61.8% (when a not-illustrated outer lens was used).

Example 3

Under conditions in which the semiconductor laser element 22 had an output of 3 W, the lens member 40 had the prism 56 disposed in the region A1 illustrated in FIG. 9, and the light emitting device 20 had the wavelength converting member 26, the light rays $Ray_{26}$ emitted from the wavelength converting member 26 and exiting through the light exiting surface 48 were confirmed in terms of its light flux and the maximum light intensity in the resulting low beam light distribution pattern.

The results showed that the light flux of the light rays $Ray_{26}$ emitted from the wavelength converting member 26 and exiting through the light exiting surface 48 was 254.8 lm and the maximum light intensity in the resulting low beam light distribution pattern was 13,150 cd. Further it was confirmed that the light flux utilization efficiency was 58.8% (when a not-illustrated outer lens was used).

The test conditions and obtained results are listed in Table 2.

TABLE 2

| | Prism (Location) | Light Flux (lm) | Max Light Intensity (cd) | Light Flux Utilization Efficiency |
|---|---|---|---|---|
| Comparative Example 2 | None | 267.5 | 14465 | 61.8% |
| Example 3 | A1 (FIG. 9) | 254.8 | 13150 | 58.8% |

According to the obtained results in Comparative Example 2 and Example 3 as listed in Table 1, even when the prism 56 disposed to extend in the same direction as the longitudinal direction of the FFP of the semiconductor laser element 22 is used in Example 3, the light flux utilization efficiency for the formation of the low beam light distribution pattern can be maintained to a certain level. Specifically, the light flux utilization efficiency in Example 3 with the prism 56 can be maintained to at most 3.0% decrease as compared with that in Comparative Example 2 without the prism 56.

Figure 12A:
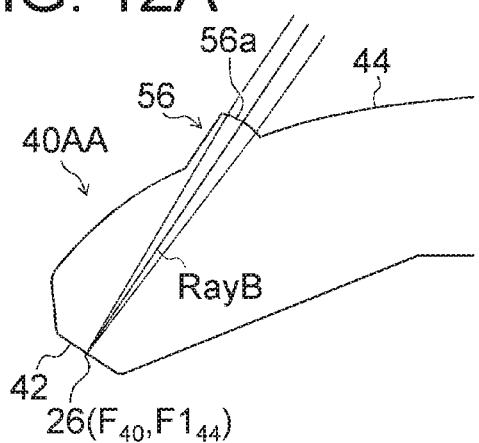
FIGS. 12A, 12B, 12C, and 12D are modified examples of the lens member 40 including a various prism 56.

The shape of the prism light exiting surface 56a can appropriately be designed according to the required functions as well as the characteristics of a photodetector to be described later. For example, the shape of the prism light exiting surface 56a may be a curved surface concave outward as illustrated in FIG. 8B such that the light rays exiting through the prism light exiting surface 56a can be diverged. Furthermore, the shape of the prism light exiting surface 56a may be a curved surface convex outward as illustrated in FIG. 12A such that the light rays exiting through the prism light exiting surface 56a can be collimated. Furthermore, the shape of the prism light exiting surface 56a may be a curved surface convex outward (not illustrated, having a larger radius of curvature) such that the light rays exiting through the prism light exiting surface 56a can be converged at a certain point.

Figure 12C:
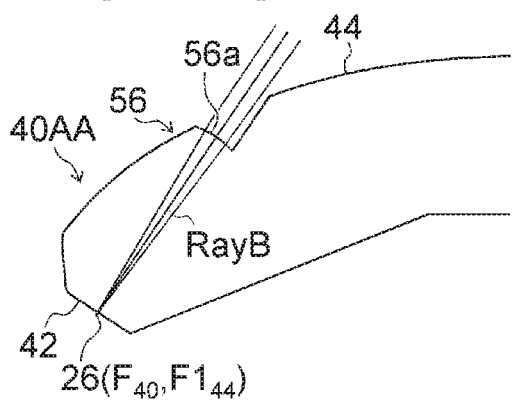
Figure 12B:
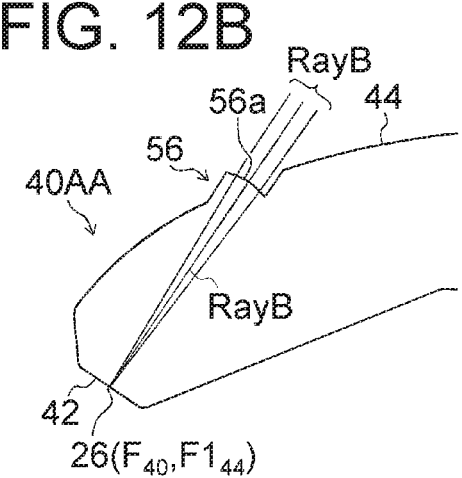
Figure 12D:
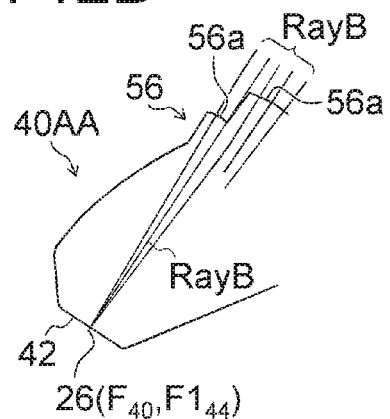

The shape of the prism 56 itself can appropriately be designed according to the required functions. Examples thereof may include a single convex prism as illustrated in FIGS. 6, 8B, and 12A, a combination of concave and convex shapes as illustrated in FIG. 12B, a recessed shape as illustrated in FIG. 12C, and a combination of two convex shapes as illustrated in FIG. 12D.

A description will now be given of a control system for the semiconductor laser element 22 and an operational example of such a system.

The system for controlling the semiconductor laser element 22 can include a photodetector 58, a control unit 60, an optical filter 62, etc. as illustrated in FIG. 8B.

The photodetector 58 can be configured to detect the intensity of at least one of the laser light (blue laser light) emitted from the semiconductor laser element 22 and the wavelength-converted light (yellow light) from the wavelength converting member 26, which exit through the prism light exiting surface 56a to the outside of the lens member 40. The photodetector 58 may be a photodiode, for example. The photodetector 58 can be disposed at or near the prism light exiting surface 56a in order to receive at least one of the laser light (blue laser light) emitted from the semiconductor laser element 22 and the wavelength-converted light (yellow light) from the wavelength converting member 26 that exit through the prism light exiting surface 56a.

The control unit 60 may be a central processing unit (CPU) to execute various programs in order to serve as a comparison unit for comparing the detection result of the photodetector 58 with a predetermined threshold value and also serve as a controller for controlling the semiconductor laser element 22 on the basis of the comparison result to turn off the semiconductor laser element 22 or shield the laser light therefrom.

The optical filter 62 can be configured to include a filter that selectively transmits yellow or blue light, for example. The optical filter 62 can be disposed between the prism light exiting surface 56a of the prism 56 and the photodetector 58. The optical filter 62 may be omitted according to the required function of the control system.

A description will next be given of the operation example of the control system with the above configuration.

The following processing can be achieved by causing the control unit 60 to read a predefined program stored in a not-illustrated storage into a RAM, etc., and then to execute the predefined program.

Operation Example 1

Operation Example 1 can be a case where the optical filter 62 is a filter configured to selectively transmit yellow light.

When the wavelength converting member 26 is disposed at the predetermined position, the photodetector 58 receives yellow light to output a detection signal in accordance with the received light amount to the control unit 60. When the wavelength converting member 26 is dislocated from the predetermined position due to some reasons, the photodetector 58 cannot receive any yellow light, and thus, the photodetector 58 can output a signal indicating the non-detection of yellow light. Here, the predetermined threshold value can be set in advance such that the threshold value is smaller than the value of the detection signal from the photodetector 58 when the wavelength converting member 26 is disposed at the predetermined position and is larger than the value of the detection signal from the photodetector 58 when the wavelength converting member 26 is dislocated from the predetermined position due to some reasons. Such the threshold value can be stored in the control unit 60.

Therefore, the control unit 60 can be configured to compare the detection result (signal) detected by the photodetector 58 with the predetermined threshold value and determine on the basis of the comparison result as to whether the wavelength converting member 26 is dislocated from the predetermined position or not. If the predetermined threshold value is larger than the detection single from the photodetector 58, the control unit 60 can determine that the wavelength converting member 26 is dislocated from the predetermined position and control the semiconductor laser element 22 not to emit laser light by stopping the supply of a current thereto or the like.

Accordingly, even when the wavelength converting member 26 is dislocated from the predetermined position due to some reasons, the laser light rays $Ray_{22}$ can be prevented from exiting through the light exiting surface 48 to the outside with further reliability because of stopping of the emission of laser light rays.

Operation Example 2

Next, Operation Example 2 can be a case where the optical filter 62 is a filter configured to selectively transmit blue light.

When the wavelength converting member 26 is disposed at the predetermined position, the photodetector 58 receives blue light to output a detection signal in accordance with the received light amount to the control unit 60. When the wavelength converting member 26 is dislocated from the predetermined position due to some reasons, the photodetector 58 receives a much amount of blue light, and thus, can output a detection signal in accordance with the received light amount to the control unit 60. Here, the predetermined threshold value can be set in advance such that the threshold value is larger than the value of the detection signal from the photodetector 58 when the wavelength converting member 26 is disposed at the predetermined position and is smaller than the value of the detection signal from the photodetector 58 when the wavelength converting member 26 is dislocated from the predetermined position due to some reasons. Such the threshold value can be stored in the control unit 60.

Therefore, the control unit 60 can be configured to compare the detection result detected by the photodetector 58 with the predetermined threshold value and determine on the basis of the comparison result as to whether the wavelength converting member 26 is dislocated from the predetermined position or not. If the detection single from the photodetector 58 is larger than the predetermined threshold value, the control unit 60 can determine that the wavelength converting member 26 is dislocated from the predetermined position and control the semiconductor laser element 22 not to emit laser light by stopping the supply of a current thereto or the like.

Accordingly, even when the wavelength converting member 26 is dislocated from the predetermined position due to some reasons, the laser light rays $Ray_{22}$ can be prevented from exiting through the light exiting surface 48 to the outside with further reliability because of stopping of the emission of laser light rays.

Operation Example 3

Operation Example 3 can be a case where the optical filter 62 is not provided.

When the wavelength converting member 26 is disposed at the predetermined position, the photodetector 58 receives light in a visible range including blue light and yellow light to output a detection signal in accordance with the received light amount to the control unit 60. When the wavelength converting member 26 is dislocated from the predetermined position due to some reasons, the photodetector 58 receives a much amount of blue light but does not receive light in a visible range including yellow light, and thus, can output a detection signal in accordance with the received light amount to the control unit 60. Here, the predetermined threshold value can be set in advance to include two values such that one of the two values is larger than the value of the detection signal from the photodetector 58 when the wavelength converting member 26 is disposed at the predetermined position, and the other one of them is smaller than that value. Such the threshold values can be stored in the control unit 60. How much the value is larger or smaller can be appropriately determined in accordance with the detection sensitivity of the photodetector 58 relative to respective wavelengths of the objective light rays.

Therefore, the control unit 60 can be configured to compare the detection result detected by the photodetector 58 with the predetermined threshold values and determine on the basis of the comparison result as to whether the wavelength converting member 26 is dislocated from the predetermined position or not. If the detection single from the photodetector 58 is out of the range between the predetermined larger threshold value and the predetermined smaller threshold value, the control unit 60 can determine that the wavelength converting member 26 is dislocated from the predetermined position and control the semiconductor laser element 22 not to emit laser light by stopping the supply of a current thereto or the like.

Accordingly, even when the wavelength converting member 26 is dislocated from the predetermined position due to some reasons, the laser light rays $Ray_{22}$ can be prevented from exiting through the light exiting surface 48 to the outside with further reliability because of stopping of the emission of laser light rays.

According to the above-mentioned exemplary embodiment of the presently disclosed subject matter, in the vehicle lighting unit 10 provided with the lens member 40 that can control light from the wavelength converting member 26 which can receive laser light for wavelength-converting the laser light and form the low beam light distribution pattern P even when the wavelength converting member 26 is dislocated from a predetermined position due to some reasons, the laser light rays $Ray_{22}$ from the semiconductor laser element 22 can be prevented from being projected through the light exiting surface 48 of the lens member 40 to the outside. This can be achieved as follows. When the wavelength converting member 26 is dislocated from the predetermined position due to some reasons, the laser light rays $Ray_{22}$ having been emitted from the semiconductor laser element 22 and entered the lens member 40 can exit through the prism light exiting surface 56a to the outside. This can prevent the laser light rays $Ray_{22}$ having been emitted from the semiconductor laser element 22 and entered the lens member 40 from being totally reflected by the first reflecting surface 44.

Next, some modified examples will be described.

Although the above-described exemplary embodiment has dealt with the case where the prism 56 having the prism light exiting surface 56a can serve as the total-reflection prevention structure 56, it is not limitative. For example, the total-reflection prevention structure 56 may be a substance that has a higher refractive index than that of the lens member 40 and disposed in close contact with the lens member 40 in a region of the first reflecting surface 44 where the laser light rays $Ray_2$ having been emitted from the semiconductor laser element 22 and entered the lens member 40 can reach (for example, the region A1 of FIG. 9 or A2 of FIG. 10). Furthermore, the total-reflection prevention structure 56 may be configured by providing small irregularities on that region of the first reflecting surface 44. The small irregularities may be provided by surface texturing or by a plurality of fine lens cuts. These configurations can achieve the same advantageous effects as described with reference to the disclosed subject matter.

In the above-described exemplary embodiment, although the description has been given of the vehicle lighting unit 10 configured to form the low beam light distribution pattern P including the cut-off lines CL1 to CL3 at its upper end edge, it is not limitative. For example, the presently disclosed subject matter can be applied to another vehicle lighting unit 10A configured to form a high beam light distribution pattern as illustrated in FIG. 13, including a lens member 40A that does not include the second reflecting surface 46 and is obtained by eliminating that structure from the previous lens member 40.

Figure 13:
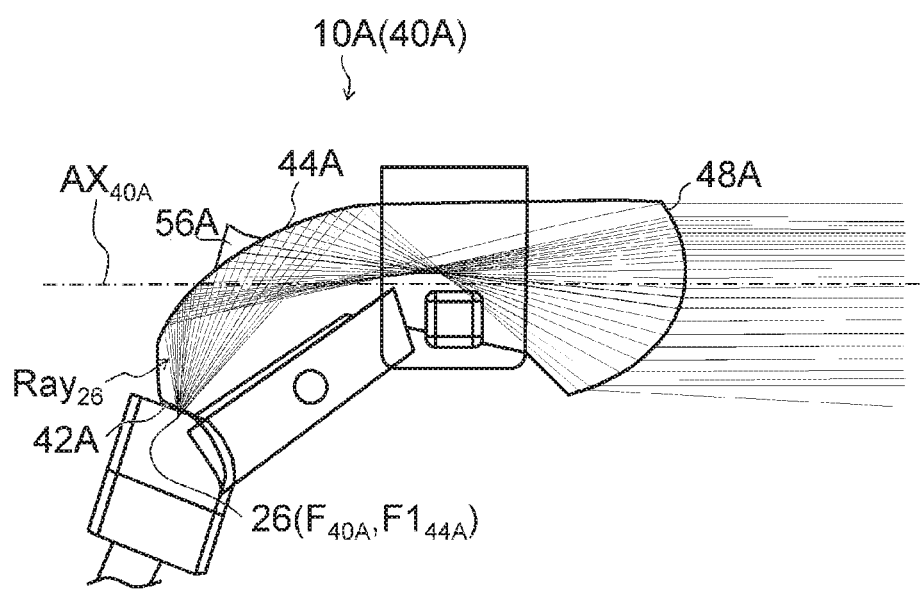
FIG. 13 is a cross-sectional side view of a vehicle lighting unit 10A including a lens member 40A as a modified example.

In FIG. 13 as a modified example, a light incident surface 42A, a first reflecting surface 44A, a light exiting surface 48A, and a prism 56A can constitute an optical system configured to form a high beam light distribution pattern (not illustrated) by causing light rays $Ray_{26}$ to enter the lens member 40A through the light incident surface 42A, be totally reflected by the first reflecting surface 44A, and then exit through the light exiting surface 48A forward.

According to the above-mentioned modified example, as in the previous exemplary embodiment, in the vehicle lighting unit 10A provided with the lens member 40A that can control light from the wavelength converting member 26 which can receive laser light for wavelength-converting the laser light and form the high beam light distribution pattern, even when the wavelength converting member 26 is dislocated from a predetermined position due to some reasons, the laser light rays $Ray_{22}$ from the semiconductor laser element 22 can be prevented from being projected through the light exiting surface 48A of the lens member 40A to the outside.

In the above-described exemplary embodiment, although the description has been given of the vehicle lighting unit 10 configured to include the light emitting device 20 in which the laser light rays from the semiconductor laser element 22 are condensed by the condenser lens 24 to irradiate the wavelength converting member 26 with the laser light rays, it is not limitative. The laser light rays from the semiconductor laser element 22 can be guided by a guiding member such as an optical fiber to the wavelength converting member 26. In this case, the FFP shape of the laser light rays from the semiconductor laser element 22 may be changed during the transmission through an optical fiber and the like to a rotational symmetric shape thereof. However, the total-reflection prevention structure can be appropriately changed according to the changed shape of the laser light.

Figure 14:
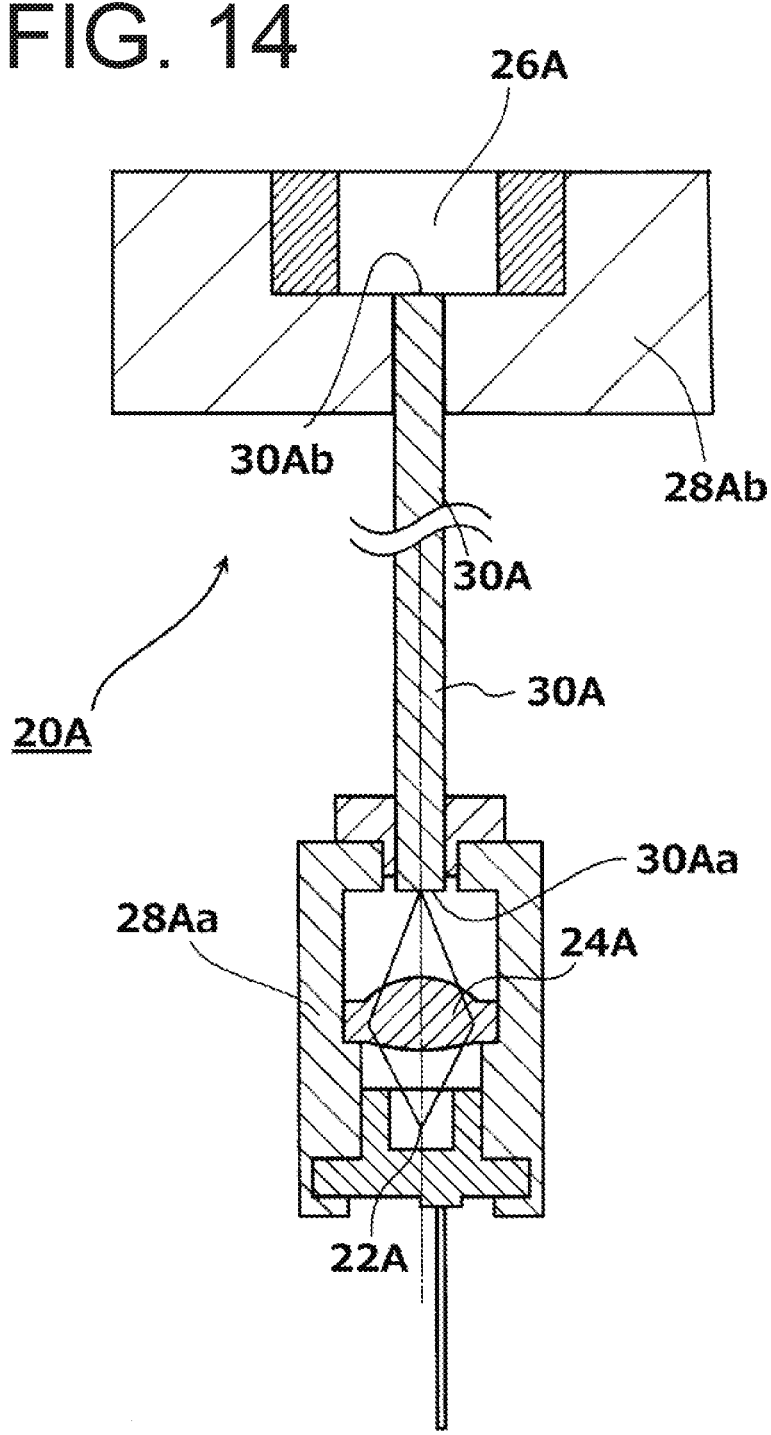
FIG. 14 is a cross-sectional view of another light emitting device including an optical fiber.

FIG. 14 is a cross-sectional view illustrating another light emitting device 20A, which can be used in place of the light emitting device 20. The light emitting device 20A can include a semiconductor light emitting element 22A which can be a laser diode, a condenser lens 24A which condenses a laser beam from the semiconductor light emitting element 22A, an optical fiber (light guiding fiber) 30A which guides the laser beam emitted from the semiconductor light emitting element 22A and condensed by the condenser lens 24A, and a wavelength converting member 26A to be irradiated with the guided light. The optical fiber 30A can include, for example, a core at the center (for example, 0.2 mm in core diameter) and a clad surrounding the core (both not illustrated). The core has a higher refractive index than that of the clad. The semiconductor light emitting element 22A, the condenser lens 24A, and one end of the optical fiber 30A can be held by a first holding member 28Aa, and the other end of the optical fiber 30A and the wavelength converting member 26A can be held by a second holding member 28Ab.

Thus, a laser beam emitted from the semiconductor light emitting element 22A and condensed by the condenser lens 24A can be introduced through one end surface 30Aa of the optical fiber 30A into the optical fiber 30A. Then, the laser beam can be guided to the other end surface 30Ab of the optical fiber 30A while being confined within the core due to total reflection on the boundary between the core and the clad, and emitted through the other end surface 30Ab so as to irradiate locally the wavelength converting member 26A disposed at a location some distance from the semiconductor light emitting element 22A.

The wavelength converting member 26A upon which the light beam is incident can emit white light as in the case of the light emitting device 20.

Also in this case, since the same lens member 40 can be used in combination with the light emitting device 20A, the same advantageous effects can be obtained.

Further, the exemplified numerical values are illustrative and can appropriately be changed in accordance with the use purpose or the like.

It will be apparent to those skilled in the art that various modifications and variations can be made in the presently disclosed subject matter without departing from the spirit or scope of the presently disclosed subject matter. Thus, it is intended that the presently disclosed subject matter cover the modifications and variations of the presently disclosed subject matter provided they come within the scope of the appended claims and their equivalents. All related art references described above are hereby incorporated in their entirety by reference.

What is claimed is:

1. A vehicle lighting unit comprising:
    a laser light source configured to emit laser light;
    a wavelength converting member configured to receive the laser light emitted from the laser light source and wavelength-convert at least part of the laser light to light with different wavelengths; and
    a lens member configured to include
        a light incident surface on which light from the wavelength converting member or the laser light is incident,
        a first reflecting surface configured to reflect the light from the light incident surface by total internal reflection,
        a light exiting surface through which the light totally reflected by the first reflecting surface can exit, and
        a total-reflection prevention structure at the first reflecting surface, the total-reflection prevention structure having a prism shape configured to prevent the laser light entering the lens member from being totally reflected by the first reflecting surface wherein:
    the lens member further includes a second reflecting surface;
    the light exiting surface is configured to be a convex lens surface having a rear-side focal point;
    the second reflecting surface is configured to extend from the rear-side focal point of the light exiting surface or a vicinity thereof rearward and have a front end edge; and
    the light incident surface, the first reflecting surface, the second reflecting surface, and the light exiting surface constitute an optical system configured to form a low beam light distribution pattern including a cut-off line at its upper edge, by causing the light emitted from the wavelength converting member and entering the lens member through the light incident surface to be totally reflected by the first reflecting surface, to be partially shielded by the second reflecting surface and partially totally reflected by the second reflecting surface to be directed to and exit through the light exiting surface forward, the cut-off line of the low beam light distribution pattern being defined by the front end edge of the second reflecting surface.

2. The vehicle lighting unit according to claim 1, wherein the total-reflection prevention structure is a prism member including a prism light exiting surface configured to allow the laser light having entered the lens member to exit therethrough to the outside.

3. The vehicle lighting unit according to claim 2, wherein the laser light source is configured by a laser diode, and an optical fiber configured to guide the laser light emitted from the laser diode to the wavelength converting member is provided.

4. The vehicle lighting unit according to claim 1, wherein the laser light source is configured by a laser diode, and an optical fiber configured to guide the laser light emitted from the laser diode to the wavelength converting member is provided.

5. The vehicle lighting unit according to claim 1, wherein the laser light source has a far field pattern in an elliptical shape with a major axis and the total-reflection prevention structure is disposed to extend in a direction same as a longitudinal direction along the major axis of the far-field pattern of the laser light source.

6. The vehicle lighting unit according to claim 5, wherein the total-reflection prevention structure is a prism member including a prism light exiting surface configured to allow the laser light having entered the lens member to exit therethrough to the outside.

7. The vehicle lighting unit according to claim 6, wherein the laser light source is configured by a laser diode, and an optical fiber configured to guide the laser light emitted from the laser diode to the wavelength converting member is provided.

8. The vehicle lighting unit according to claim 5, wherein the laser light source is configured by a laser diode, and an optical fiber configured to guide the laser light emitted from the laser diode to the wavelength converting member is provided.

9. A vehicle lighting unit comprising:
    a laser light source configured to emit laser light;
    a wavelength converting member configured to receive the laser light emitted from the laser light source and wavelength-convert at least part of the laser light to light with different wavelengths;
    a lens member configured to include
        a light incident surface on which light from the wavelength converting member or the laser light is incident,
        a first reflecting surface configured to reflect the light from the light incident surface by total internal reflection,
        a light exiting surface through which the light totally reflected by the first reflecting surface can exit, and
        a total-reflection prevention structure at the first reflecting surface, the total-reflection prevention structure having a prism shape configured to prevent the laser light entering the lens member from being totally reflected by the first reflecting surface;

a photodetector configured to detect an intensity of at least one of the laser light from the laser light source and the wavelength-converted light from the wavelength converting member that is emitted/not reflected by the first reflecting surface and exit to the outside of the lens member, the photodetector being configured to output a detection result; and a control unit configured to compare a predefined threshold value with the detection result from the photodetector and control the laser light source on the basis of a comparison result to unpower the laser light source so as to prevent the laser light source from emitting laser light.

10. The vehicle lighting unit according to claim 9 wherein:

the lens member further includes a second reflecting surface;

the light exiting surface is configured to be a convex lens surface having a rear-side focal point;

the second reflecting surface is configured to extend from the rear-side focal point of the light exiting surface or a vicinity thereof rearward and have a front end edge; and the light incident surface, the first reflecting surface, the second reflecting surface, and the light exiting surface constitute an optical system configured to form a low beam light distribution pattern including a cut-off line at its upper edge, by causing the light emitted from the wavelength converting member and entering the lens member through the light incident surface to be totally reflected by the first reflecting surface, to be partially shielded by the second reflecting surface and partially totally reflected by the second reflecting surface to be directed to and exit through the light exiting surface forward, the cut-off line of the low beam light distribution pattern being defined by the front end edge of the second reflecting surface.

11. The vehicle lighting unit according to claim 10, wherein the total-reflection prevention structure is a prism member including a prism light exiting surface configured to allow the laser light having entered the lens member to exit therethrough to the outside.

12. The vehicle lighting unit according to claim 10, wherein the laser light source has a far field pattern in an elliptical shape with a major axis and the total-reflection prevention structure is disposed to extend in a direction same as a longitudinal direction along the major axis of the far-field pattern of the laser light source.

13. The vehicle lighting unit according to claim 9 wherein:

the light exiting surface is configured to be a convex lens surface having a rear-side focal point; and the light incident surface, the first reflecting surface, and the light exiting surface constitute an optical system configured to form a high-beam light distribution pattern, by causing the light emitted from the wavelength converting member and entering the lens member through the light incident surface to be totally reflected by the first reflecting surface and then, to exit through the light exiting surface forward.

14. The vehicle lighting unit according to claim 13, wherein the laser light source is configured by a laser diode, and an optical fiber configured to guide the laser light emitted from the laser diode to the wavelength converting member is provided.

15. The vehicle lighting unit according to claim 13, wherein the laser light source has a far field pattern in an elliptical shape with a major axis and the total-reflection prevention structure is disposed to extend in a direction same as a longitudinal direction along the major axis of the far-field pattern of the laser light source.

16. The vehicle lighting unit according to claim 9 wherein the total-reflection prevention structure is a prism member including a prism light exiting surface configured to allow the laser light having entered the lens member to exit therethrough to the outside.

17. The vehicle lighting unit according to claim 16, wherein:

the light exiting surface is configured to be a convex lens surface having a rear-side focal point; and the light incident surface, the first reflecting surface, and the light exiting surface constitute an optical system configured to form a high-beam light distribution pattern, by causing the light emitted from the wavelength converting member and entering the lens member through the light incident surface to be totally reflected by the first reflecting surface and then, to exit through the light exiting surface forward.

18. The vehicle lighting unit according to claim 16, wherein the laser light source is configured by a laser diode, and an optical fiber configured to guide the laser light emitted from the laser diode to the wavelength converting member is provided.

19. The vehicle lighting unit according to claim 16, wherein the laser light source has a far field pattern in an elliptical shape with a major axis and the total-reflection prevention structure is disposed to extend in a direction same as a longitudinal direction along the major axis of the far-field pattern of the laser light source.

20. The vehicle lighting unit according to claim 9 wherein the laser light source is configured by a laser diode, and an optical fiber configured to guide the laser light emitted from the laser diode to the wavelength converting member is provided.

21. The vehicle lighting unit according to claim 20, wherein the laser light source has a far field pattern in an elliptical shape with a major axis and the total-reflection prevention structure is disposed to extend in a direction same as a longitudinal direction along the major axis of the far-field pattern of the laser light source.

22. The vehicle lighting unit according to claim 9, wherein the laser light source has a far field pattern in an elliptical shape with a major axis and the total-reflection prevention structure is disposed to extend in a direction same as a longitudinal direction along the major axis of the far-field pattern of the laser light source.

* * * * *